(12) United States Patent
Willibald-Ettle et al.

(10) Patent No.: US 6,248,386 B1
(45) Date of Patent: Jun. 19, 2001

(54) PROCESS FOR PRODUCING HARD CARAMELS AND TABLETS

(75) Inventors: Ingrid Willibald-Ettle, Landau (DE); Ondrej Mikla, Langenlebarn (AT)

(73) Assignee: Sudzucker Aktiengesellschaft (DE)

( * ) Notice: Subject to any disclaimer, the term of this patent is extended or adjusted under 35 U.S.C. 154(b) by 0 days.

(21) Appl. No.: 09/380,431

(22) PCT Filed: Feb. 11, 1998

(86) PCT No.: PCT/EP98/00750

§ 371 Date: Sep. 1, 1999

§ 102(e) Date: Sep. 1, 1999

(87) PCT Pub. No.: WO98/39978

PCT Pub. Date: Sep. 17, 1998

(30) Foreign Application Priority Data

Mar. 7, 1997 (DE) .............................. 197 09 304

(51) Int. Cl.$^7$ ...................................... A23P 1/12
(52) U.S. Cl. .................. 426/516; 426/660; 426/74; 424/440
(58) Field of Search ................... 426/516, 660, 426/74; 424/440

(56) References Cited

U.S. PATENT DOCUMENTS

| | | | |
|---|---|---|---|
| 2,594,538 | * | 4/1952 | Brabaek . |
| 3,265,508 | * | 8/1966 | Wurzburg et al. . |
| 3,265,509 | * | 8/1966 | Wurzburg et al. . |
| 3,265,510 | * | 8/1966 | Wurzburg et al. . |
| 3,619,292 | * | 11/1971 | Brouillard et al. . |
| 4,056,640 | * | 11/1977 | Otto . |
| 4,292,337 | * | 9/1981 | Andersen . |
| 4,358,469 | * | 11/1982 | Lavie . |
| 4,567,055 | | 1/1986 | Staley . |
| 4,657,501 | * | 4/1987 | Klacik et al. . |
| 4,666,730 | * | 5/1987 | Mergelsberg . |
| 4,713,256 | * | 12/1987 | Chaveron et al. . |
| 4,732,775 | | 3/1988 | Werner . |
| 4,839,193 | * | 6/1989 | Mange et al. . |
| 4,948,615 | | 8/1990 | Zallie et al. . |
| 4,971,798 | * | 11/1990 | Coia et al. . |
| 5,013,575 | * | 5/1991 | Stadler et al. . |
| 5,085,876 | * | 2/1992 | Tsau . |
| 5,223,303 | * | 6/1993 | Taskinen . |
| 5,472,733 | * | 12/1995 | Degady et al. . |
| 5,897,891 | * | 4/1999 | Godfrey . |

FOREIGN PATENT DOCUMENTS

| | | |
|---|---|---|
| 1043784 | 11/1958 | (DE) . |
| 1285283 | 12/1968 | (DE) . |
| 2461543 U | 7/1975 | (DE) . |
| 2520173 U | 12/1976 | (DE) . |
| 0175160 | 3/1986 | (EP) . |
| 0625578 | 11/1994 | (EP) . |
| 2733122 | 10/1996 | (FR) . |
| 2131670 | 6/1984 | (GB) . |
| 9730598 | 8/1997 | (WO) . |

* cited by examiner

*Primary Examiner*—Cynthia L. Nessler
(74) *Attorney, Agent, or Firm*—Ostrolenk, Faber, Gerb & Soffen, LLP

(57) ABSTRACT

A process is disclosed for producing vitreous molten mass from sweeteners by means of an extruder, in particular a double screw extruder. The sweetener is introduced into an inlet zone of the extruder, is extruded in a melting zone at an increased temperature, in a vacuum zone at a reduced pressure and increased temperature, and finally in a cooling zone at a reduced temperature, forming a vitreous molten mass.

22 Claims, 1 Drawing Sheet

PROCESS FOR PRODUCING HARD CARAMELS AND TABLETS

This application has been filed under 35 U.S.C. 371 as a national stage application of PCT/EP98/00750, filed Feb. 11, 1998.

DESCRIPTION

This invention concerns a process for preparing a glass-like plastic mass from a mixture of sweetening agents.

The preparation of sugar substances for confectionery purposes based on an extrusion process is known DE 24 61 543 C2 describes such a process in which liquid glucose and crystal sugar are fed into a double-screw extruder, this mixture is kneaded at elevated temperature and pressure, the pressure is reduced and the mixture is compressed. A decrystallised melted sugar substance is obtained which can be used afterwards for preparing hard caramel sweets, for example.

From U.S. Pat. No. 5,472,733 a process is known for preparing a glass-like plastic mass, in which process a sweetener is fed into a double-screw extruder, the sweetener is melted and fed through adjustable baffles. The patent describes how a glass-like plastic mass can be obtained by the setting of particular pressure ratios controllable by means of a pressure relief valve and particular temperature equalisation.

The described process has the disadvantage that the glass-like plastic mass obtained in the output from the extruder has comparatively high temperatures and that is why it has to be cooled on cooling conveyors of appropriate length. This requires major expenditure on equipment and relatively large building space for the cooling conveyors as well as prolonged cooling times. In addition, the incorporation of flavourings and active ingredients has to carried out at high temperatures, which in many cases has undesirable effects on the stability of the incorporated tastes and active ingredients.

Thus the underlying technical problem of the invention is in providing a process for preparing a glass-like plastic mass, preferably sugar-free, suitable for confectionery purposes, which overcomes the afore-mentioned disadvantages, in particular leading to a product which can be easily processed further.

The underlying technical problem of this invention is solved by providing a process for preparing a glass-like plastic mass, preferably sugar-free, from a mixture of sweetening agents, in which the sweetening mixture is fed into the charging zone of an extruder, especially a double-screw extruder, then into a melting zone at elevated temperature, following this into a vacuum zone at reduced pressure and increased temperature, and following this is extruded into a cooling zone at reduced temperature and a glass-like plastic mass is obtained. The process according to the invention thus results in a glass-like plastic mass being obtained, which has a reduced temperature compared with the temperature prevailing in the melting zone and therefore can be cooled considerably faster and on shorter cooling conveyors. Furthermore, it is possible to incorporate flavourings and/or active ingredients, in particular pharmaceutically-active ingredients, at lower temperatures in the cooling zone.

Obviously it is also possible to feed the flavourings and/or active ingredients into the sweetener mixture or sweetening agent before feeding into the charging zone, if the flavourings or active ingredients are temperature-stable.

The use of the so-called in-line mixers, which usually are used for this purpose in the traditional extrusion process, can be omitted. In addition, the process according to the invention is advantageous in that the expenditure on equipment, particularly the design of the screw extruder, is comparatively simple. A screw extruder which can be used according to the invention requires no adjustable baffles or screw elements, which regulate the stream of the extrusion mass, and is commercially available from the Togum Company.

In the context of this invention, a sweetening agent is understood to mean a substance with properties producing a sweet sensation, which is found, depending on specific implementation, in foodstuffs, stimulants, pharmaceuticals or similar material and which can be used as a carrier or additive for pharmaceutically-active additives, flavourings, tastes, fragrances or colourings. In a particularly advantageous way, the sweetening agent mixture used for the process according to the invention contains 100% of the sweetening agent cited below or a mixture of at least two of these sweetening agents. However, provision can be made for the sweetening agent mixture to contain only 1–99%, preferably 50–95%, of the sweetener agent cited below and in addition to have flavourings, active ingredients, minerals, salts, carriers and fillers, for example polymers.

The sweetening agent can be inulin, invert sugar, a 1:1 mixture of 6-0-α-D-glucopyranosyl-D-sorbitol (1,6-GPS) and 1-0-α-D-glucopyranosyl-D-mannitol (1,1-GPM) known from DE 25 20 173, a sweetening agent described in EP 0 625 578 B1 consisting of 1,6-GPS, 1,1-GPM, 1-0-α-D-glucopyranosyl-D-sorbitol (1,1-GPS), mannitol, sorbitol and oligosaccharides, polydextrose, hydrogenated and non-hydrogenated starch hydrolysate, a sugar alcohol, a monosaccharide or disaccharide as well as a polysaccharide. Xylose, ribulose, glucose, mannose, fructose, isomaltose, isomaltulose, galactose, saccharose, maltose and the like can be considered as a monosaccharide or disaccharide. Sorbitol, xylitol, mannitol, galacitol, maltitol, 1,6-GPS, 1,1-GPS, 1,1-GPM and the like can be considered as a sugar alcohol.

In the context of this invention, a charging zone of an extruder is understood to mean the area of the extruder in which the sweetening agent mixture to be extruded is loaded. The melting zone is understood to means the area of the extruder in which the melting and decrystallisation of the inserted sweetening agent mixture takes place at elevated temperature. The vacuum zone is understood to mean the area of the extruder in which extrusion takes place under reduced pressure. The cooling zone is understood to mean the area of the extruder in which the extrusion mass heated during the melting process is gradually cooled.

The process according to the invention leads to a cooled glass-like plastic mass which exists advantageously in a form capable of stamping.

In a particularly preferred form of implementation of the invention, a temperature of 130° C. to 210° C., preferably 170° C. to 210° C., exists in the melting zone of the extruder. In a particularly advantageous manner, provision is made for the melting zone to be divided into several segments which are at different temperatures. According to the invention, preference is given to providing four segments in the melting zone, in which the prevailing temperature in the first segment is 177° C., in the second segment 205° C., in the third segment 188° C. and in the fourth segment 191° C.

In another particularly preferred form of implementation, provision is made for a temperature of 120° C. to 160° C., in particular 133° C., to be used in the vacuum zone.

The invention preferentially provides for a pressure of 0.70 to 0.98 bar, in particular 0.78 bar, to be used in the vacuum zone.

According to another design of this invention, provision is made for a temperature of 60° C. to 130° C., preferably 80° C. to 120° C., to be used in the cooling zone. The invention particularly provides for the cooling zone to be divided into several segments which are at different temperatures. According to the invention, three segments are preferred, in which in the first segment a temperature of 120° C. is to be used, in the second segment a temperature of 120° C., and in the third segment a temperature of 80° C.

The temperature data refers to the temperature in the jacket of the extruder and not in the melt. The temperatures in the melt is approximately 20 to 30° C. below the jacket temperature.

The invention advantageously provides for the extruder to be designed as a double-screw extruder.

Obviously the invention can be implemented by using any extruder, provided that the latter can be correspondingly configured to the parameters according to the invention.

In an especially preferred form of implementation, the invention provides for the extruder to be sealed at its end and the extrusion mass to be drawn off towards the bottom. A particularly clear, bubble-free plastic mass is produced according to this form of implementation. Obviously it is also possible to not seal the extruder at its end but to provide it with a delivery nozzle. The extrusion mass then does not come out from the extruder towards the bottom, but in a straight extension of the longitudinal axis of the screw.

The invention also concerns a glass-like plastic mass which has been prepared in accordance with a process according to the invention, an extrudate which can be stamped and which is suitable, for example, for preparing hard caramel sweets or tablets, and products containing the plastic mass. In an advantageous manner, further cooling of the plastic mass on the cooling conveyors is not necessary during further processing before stamping of the plastic mass.

The invention also concerns a use of a glass-like plastic mass according to this invention for the preparation of tablets, in particular by pressing, the said tablets containing preferably pharmaceutically-active additives, or for the preparation of hard caramel sweets.

The invention accordingly also concerns hard caramel sweets and tablets, preferably sugar-free, which contain the plastic mass prepared by means of the process according to the invention and which can be prepared from this plastic mass by means of normal processes.

BRIEF DESCRIPTION OF THE DRAWINGS

The invention is explained in more detail below with reference to drawings and associated examples of implementation. The drawings show.

DESCRIPTION OF THE DRAWINGS

Figure 1:
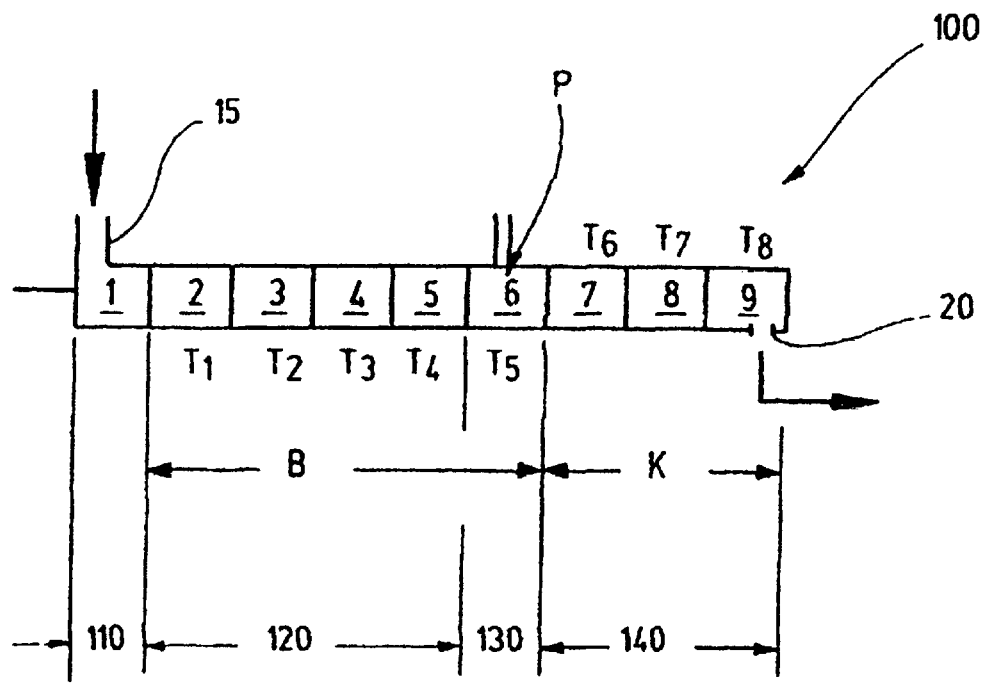
in FIG. 1 schematically the design of an extruder which can be used according to the invention and in FIG. 2 an additional form of design of an extruder of that kind, which has an inlet for metering active ingredients and flavourings.

FIG. 1 clearly shows in schematic form the design of a double-screw extruder 100, (Togum, TO-EX 70) with a screw diameter of 70 mm and a length of approximately 4.0 m. The extruder is designed with a maximum power of 33 kW and operates at a speed of 8 revolutions per minute.

At one end, the extruder 100 has a charging zone 110 which is set out as Segment 1. Segment 1 has an upwardly-directed opening 15 for feeding in the sweetening agent mixture (arrow). The charging zone 110 is followed by the melting zone 120. The melting zone 120 is divided into four segments 2, 3, 4 and 5 in which in Zone 2 the temperature $T_1$ is 177° C., in Zone 3 the temperature $T_2$ is 205° C., in Zone 4 the temperature $T_3$ is 188° C. and in Zone 5 the temperature $T_4$ is 191° C.

Zones 2 to 5 are insulated and heated electrically (B).

The melting zone 120 is followed by the vacuum zone 130, which is designed in the form of Segment 6 and has a temperature $T_5$ of 133° C. An electrical heater B is also provided here, by which spraying material is melted during the vacuum process. In the vacuum zone 6 the air pressure P is 0.78 bar, which is used to degas the plastic mass.

Following the vacuum zone 130 is the cooling zone 140, which is designed in the form of three segments 7, 8 and 9. Segment 7 has a temperature $T_6$ of 120° C., Segment 8 has a temperature $T_7$ of 120° C. and Segment 9 has a temperature $T_8$ of 80° C. Segment 9 has a downward-directed outlet opening 20 from which the cooled glass-like plastic mass (arrow) emerges.

Temperature measurement is carried out in the extruder jacket. The temperature of the extrusion mass is approximately 20 to 30° below the jacket temperature.

Double-screw extruders suitable for implementing this invention are for example those double-screw extruders from the Togum Company, which are available on the market under the name TO-EX and can be used according to the foregoing text of this invention.

The process according to the invention runs as follows:

After the above-mentioned temperatures in the individual segments of the extruder 100 were set by means of an electrical heater B and by liquid cooling K carried out for example by means of the so-called "single equipment", Isomalt® (a near equimolar mixture of 1,1-GPM and 1,6-GPS) is fed in through the inlet opening 15 in the segment 1. The sweetening agent mixture is conveyed with a mass flow rate of 50 kg of plastic mass per hour through the double-screw, which rotates with a speed of 8 revolutions per minute, through the melting zone 120, the vacuum zone 130 and the cooling zone 140, in which the sweetening agent mixture is melted, outgassed and cooled. The plastic mass is not worked by means of separate kneading elements or baffles. After cooling of the plastic mass to or below 100° C., the latter is led downward out of the segment 9. A clear, bubble-free plastic mass is obtained with a temperature below or about 100° C. The plastic mass has a moisture content markedly below 2% by weight and can be cooled or directly stamped at the temperature of an extrudate capable of stamping, i.e. approximately 80° C.

For the preparation of the hard caramel sweets, the extrudate is first fed through a conical roller and then stamped by means of a normal stamping machine to form hard caramel sweets.

For the preparation of tablets, the stamping-capable extrudate is for example fed through rollers, as described in EP 0 240 906 B1 for instance, and the desired tablet shape is produced in the course of this.

Figure 2:
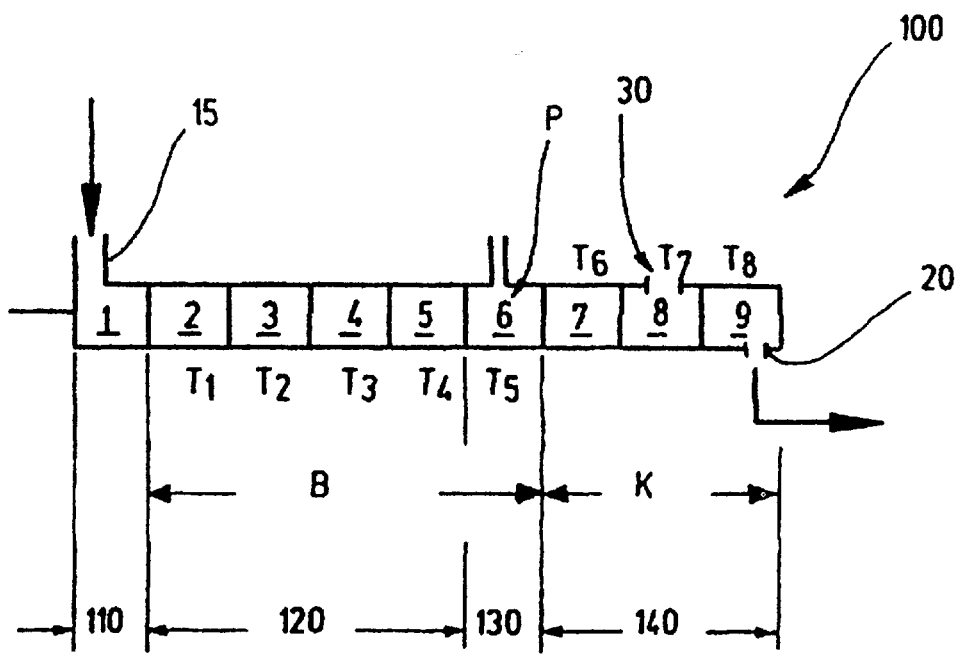

FIG. 2 shows a design essentially similar to the design of the extruder in FIG. 1, though in which an inlet opening 30 is provided in the cooling zone 140, in particular in segment 8, through which inlet opening can be supplied pharmaceutically-active additives, flavourings, tastes, fragrances or colourings. Because of the lower temperature of the plastic mass in Zone 140, the spectrum of the substances which can be incorporated into the plastic mass is widened and its stability is increased.

What is claimed is:

1. A process for preparing a glass-like plastic mass from at least one sweetening agent mixture by means of an extruder, in which extruder the sweetening agent mixture is fed into a charging zone of the extruder, into the melting zone at elevated temperature of 130° C. to 210° C., into a vacuum zone at reduced pressure and elevated temperature of 60° C. to 130° C., and a glass-like plastic mass is obtained.

2. A process according to claim 1, wherein there is a temperature of 170° C. to 210° C. in the melting zone.

3. A process according to claim 1, wherein there is a temperature of 133° C. in the vacuum zone.

4. A process according to claim 1, wherein there is a temperature of 80° C. to 120° C. in the cooling zone.

5. A process according to claim 1, wherein glass-like plastic mass is led downward out of the last segment.

6. A process according to claim 1, wherein the extruder is operated at a speed of 8 revolutions per minute.

7. A process according to claim 1, wherein flavourings, minerals, salts, tastes, fragrances, colourings or pharmaceutically-active additives are fed into the plastic mass in the cooling zone.

8. A process according to claim 1, wherein the sweetener contained in the sweetening agent mixture is a monosaccharide, disaccharide, polysaccharide, sugar alcohol, a polydextrose, maltodextrin, inulin or a mixture of these.

9. A process according to claim 1, wherein the sweetener contained in the sweetening agent mixture is xylose, ribulose, glucose, mannose, galactose, fructose, maltose, invert sugar, hydrogenated or non-hydrogenated starch hydrolysate, sorbitol, xylitol, lactitol, mannitol, galactitol, maltitol, 1,1-GPM (1-0-α-D-glucopyranosyl-D-mannitol), 1,1-GPS (1-0-α-D-glucopyranosyl-D-sorbitol), 1,6-GPS (6-0-α-D-glucopyranosyl-D-sorbitol), isomaltulose, maltulose, saccharose, trehalulose, lactulose or a mixture of these substances.

10. A process according to claim 1, wherein the sweetener contained in the sweetening agent mixture is a mixture of 1,6-GPS (6-0-α-D-galucopyranosyl-D-sorbitol), 1,1-GPM (1-0-α-D-glucopyranosyl-D-mannitol), 1,1-GPS (1-0-α-D-glucopyranosyl-D-sorbitol), mannitol and sorbitol.

11. A process according to claim 1, wherein the process is effected in a double-screw extruder.

12. A process according to claim 1, wherein the glass-like plastic mass obtained is converted into a tablet or hard caramel sweet.

13. A process according to claim 1, wherein there is a pressure of 0.70 to 0.98 bar in the vacuum zone.

14. A process according to claim 13, wherein there is a pressure of 0.78 bar in the vacuum zone.

15. A process according to claim 1, wherein the melting zone is divided into several segments having varying temperatures.

16. A process according to claim 15, wherein the melting zone is divided into four segments having temperatures of 177° C., 205° C., 188° C. and 191° C., respectively.

17. A process according to claim 1, wherein the cooling zone is divided into several segments having varying temperatures.

18. A process according to claim 17, wherein the cooling zone is divided into three segments having temperatures of 120° C., 120° C. and 80° C., respectively.

19. A process according to claim 1, wherein the glass-like plastic mass is further cooled after leaving the extruder.

20. A process according to claim 19, wherein the glass-like plastic mass is cooled after leaving the extruder on cooling conveyors.

21. A process according to claim 1, wherein the sweetener contained in the sweetening agent mixture is a mixture of 1,6-GPS (6-0-α-D-glucopyranosyl-D-sorbitol) and 1,1-GPM (1-0-α-D-glucopryranosyl-D-mannitol).

22. A process according to claim 21, wherein the mixture is a near equimolar mixture of 1,1-GPS and 1,1-GPM.

* * * * *